Patented June 27, 1950

2,512,633

UNITED STATES PATENT OFFICE 2,512,633

MODIFIED HYDRAZIDE POLYMERS

James Wotherspoon Fisher and Edward William Wheatley, Spondon, near Derby, England, assignors to Celanese Corporation of America, a corporation of Delaware No Drawing. Application July 15, 1949, Serial No. 105,056. In Great Britain March 12, 1948

4 Claims. (Cl. 260—2)

This invention relates to improvements in the production of polymeric materials and is more particularly concerned with the production of polymers suitable for the formation of filaments, films and plastic materials. The application is a continuation-in-part of our application S. No. 79,116, filed March 1, 1949.

U. S. application S. No. 609,031, filed August 4, 1945, describes the production of nitrogen-containing polymers by heating dihydrazides of dicarboxylic acids in presence of hydrazine, e. g. 10% by weight of the dihydrazide, over and above that combined in the dihydrazide, and also describes using dicarboxylic esters with an amount of hydrazine in excess of two moles for each mole of dicarboxylic acid. U. S. application S. No. 662,628, filed April 16, 1946 describes the production of such polymers from hydrazine and the dicarboxylic acids themselves or their anhydrides, again using more than two moles of hydrazine. Further, U. S. application S. No. 662,628, filed April 16, 1946 describes the production of nitrogen-containing polymers from mixtures of diamides and dihydrazides of dicarboxylic acids with free hydrazine, from dicarboxylic acids, esters or anhydrides with ammonia and hydrazine using more than two moles of total base including more than one mole of hydrazine, and from dinitriles of dicarboxylic acids with more than two moles of hydrazine. Polymers may be produced according to the processes of these U. S. applications which possess characteristics, including resistance to degenerative hydrolysis by boiling hydrochloric acid, indicating that they contain the 1.2.4-triazole nucleus repeated along the main polymer chain. These polymers will be referred to in the present specification as polymers containing the 1.2.4-triazole nucleus. Polymers of high melting point and high nitrogen content approximating to the theoretical nitrogen content for the polymer containing the 4-amino-1.2.4-triazole nucleus repeated at intervals along the polymer chain, and linked together by the links derived from the dicarboxylic acid or derivative used as starting material, will be referred to as polymers containing the 4-amino-1.2.4-triazole nucleus.

When a dicarboxylic acid or derivative thereof is heated with an amount of hydrazine (combined with the dicarboxylic acid and/or free) from about 1–2 moles for each mole of dicarboxylic acid, nitrogen containing polymers are produced which are hydrolysed by boiling hydrochloric acid so as to yield a hydrolysis product which has a much lower intrinsic viscosity than the original polymer, and indeed the hydrolysis product may consist substantially of monomeric material. Probably the links in such a polymer are largely or wholly of the hydrazide type —CO.NH.NH.CO— or of the 1.3.4-oxdiazole type

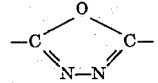

since both these types are broken down by boiling hydrochloric acid.

As described in our U. S. application S. No. 79,116, filed March 1, 1949, we have found that these polymers obtainable from dicarboxylic acids and hydrazine or their equivalent raw materials, which are subject to hydrolysis by boiling hydrochloric acid, may be treated with ammonia or with hydrazine to produce polymers very similar in character to those described in U. S. application S. No. 662,628, filed April 16, 1946, and U. S. application S. No. 609,031, filed August 4, 1945, which are substantially resistant to degenerative hydrolysis by hydrochloric acid.

We have now found further examples of compounds which may be used instead of ammonia or hydrazine in the process of our U. S. application S. No. 79,116, filed March 1, 1949. All these compounds are organic compounds containing a primary amino group and are mono-substitution products of ammonia or mono-substitution products of hydrazine or asymmetric di-substituted hydrazines.

Examples of such compounds include methylamine, ethylamine, the proplyamines and butylamines, aniline, the toluidines and xylidines, mono-methyl, -ethyl and phenyl hydrazines and the corresponding asymmetric di-substituted hydrazines and also mixed asymmetric di-substituted hydrazines for example N.N-methyl-phenyl hydrazine; acetamide, benzamide, acetyl hydrazine, benzoyl hydrazine, cyanamide, urea, guanidine and the like. Organic amino compounds containing a substituent in the organic radicle attached to the primary amino group may also be used as for example amino-pivalonitrile or a glycine ester. Again, compounds conta'ning two or more primary amino groups may be used for example tetramethylene diamine or hexamethylene diamine.

The use of ammonia or hydrazine as described in our earlier U. S. application S. No. 79,116, filed March 1, 1949, results in polymers having characteristics very similar indeed to those of U. S. application S. No. 662,628, filed April 16, 1946, and U. S. application S. No. 609,031, filed August 4, 1945. These polymers are crystalline so that if of sufficiently high molecular weight fibres may readily be drawn from melts of the polymers. The use of compounds according to the present invention which are organic compounds containing primary amino groups leads to polymers of considerably increased resistance to hydrolysis as in U. S. application S. No. 79,116, filed March 1, 1949. Indeed, the polymers may be quite resistant to hydrolysis by boiling hydrochloric acid in the sense that the intrinsic viscosity of the polymer regenerated from the hydrolysis mixture may be very little, if any, below that of the polymer before hydrolysis. However, the effect of the substituent group in the triazole rings may substantially reduce the crystallinity of the polymer and also its melting point. In consequence, the polymers of the present invention are generally lower melting than those of the earlier specifications referred to and are more generally useful for incorporation in lacquers or for other purposes to which synthetic resins are applied.

The general conditions for carrying out the treatment of the hydrolysable polymers with the organic compounds containing primary amino groups are similar to those of U. S. application S. No. 662,628, filed April 16, 1946, and U. S. application S. No. 609,031, filed August 4, 1945. For example, the reaction may be generally carried out at temperatures of the order of 150–300° C., and especially about 230–280° C., and may be carried out with the reagents, i. e. the polymer and the compound containing the $NH_2$ group, in the molten state, or the reagents may be suspended or dissolved in a suitable diluent, for example a cresol or a xylenol. Water is eliminated as a result of the reaction, but inasmuch as the reaction is irreversible, i. e. the resulting triazole links are not hydrolysable, it is not necessary to carry the reaction out or to complete the reaction under reduced pressure, as is usually the case with condensation polymers. However, if desired, the pressure may be reduced to below atmospheric pressure, particularly in the later stages. Generally it is preferred to heat the reagents together in a closed vessel under the autogenous pressure produced by the vapours of the reagent and/or solvent, and to release this pressure wholly or in part in the later stages of the reaction. In view of the fact that the reaction is irreversible, water may be used as a diluent and may or may not be allowed to escape, e. g. when the pressure is reduced.

The invention may further be applied to polymers containing the above hydrolysable links, i. e. the hydrazide link —CO.NH.NH.CO— or the oxdiazole link

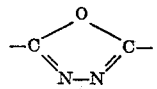

together with other linkages, and notably the carboxylic amide link. Thus, for example, a polymer may first be produced by condensing an amount of dicarboxylic acid with a substantially equivalent amount of a mixture of bases, including both a diamine, e. g. a polymethylene diamine, and hydrazine, and the resulting hydrolysable polymer may then be treated with a compound containing an amino group as described above. Thus, for example, hexamethylene diammonium adipate and hydrazine adipate (one mole of hydrazine to one mole of adipic acid) may be co-condensed in any desired proportions, for example one mole of the diammonium adipate to one mole of the hydrazine adipate up to five or more moles of the diammonium adipate to one mole of the hydrazine adipate. This polymerisation is preferably continued until a fibre-forming polymer is produced. The resulting polymer may then be treated with an amino compound as described above.

In the above preparation, the hydrazine adipate containing one mole of hydrazine to one mole of adipic acid may be replaced by a composition containing between one and two moles of hydrazine to one mole of adipic acid. Further, the diamine and the adipic acid may respectively be replaced by other diamines and other dicarboxylic acids. Again, if desired, the hydrazine salt of the dicarboxylic acid or the composition containing between one and two moles of hydrazine to one mole of dicarboxylic acid may be polymerised alone and the product then heated together with a diamine salt of a dicarboxylic acid, or alternatively the diamine salt of the dicarboxylic acid may be pre-condensed and the product then heated with hydrazine adipate or other composition containing between one and two moles of hydrazine to one of dicarboxylic acid, or, as a still further alternative, both the diamine salt of the dicarboxylic acid and the composition containing the hydrazine and the dicarboxylic acid may be separately condensed and the two condensation products then condensed together to produce the starting polymer for treatment with a compound containing an amino group in accordance with the invention.

The following examples illustrate the invention:—

EXAMPLE 1

*Preparation of hydrolysable polymer*

100 parts of mono-hydrazine sebacate (1 mole hydrazine to 1 mole sebacic acid) were heated under nitrogen for 1 hour at 200° C. and then for a further 3 hours at 240° C. and an absolute pressure of 2 mms. of mercury. The product was a brittle solid melting at 295–300° C. and on analysis showed a nitrogen content of 12.8%. It was insoluble in water, acetone, methanol and cold meta-cresol. The loss in weight was 18.12 parts compared with a theoretical loss of 15.38 for a polymer containing hydrazide links —CO.NH.NH.CO— alone, and 23.08 parts for a polymer containing 1.3.4-oxdiazole links alone. On boiling for 5 hours with 20% hydrochloric acid, substantial quantities of sebacic acid and hydrazine were set free and no oily hydrochloride was formed such as is formed on boiling with hydrochloride acid the polymers from sebacic acid described in U. S. application S. No. 662,628, filed April 16, 1946, and U. S. application S. No. 609,031, filed August 4, 1945.

EXAMPLE 2

*Treatment of hydrolysable polymer with phenyl hydrazine*

18 parts by weight of the polymer prepared according to Example 1 were heated in an autoclave for 2 hours with 20 parts by weight of phenyl hydrazine at 220° C. and then for a further 2 hours at 240° C. The maximum pressure recorded was 370 lb. per square inch gauge pressure. The product was a tough, smooth, brown resinous material of melting point 75–80° C. It was insoluble in hot water but slightly plastified by it and was soluble in methanol and in 50/50 methanol/chloroform. It formed long, weak filaments from the melt. Upon boiling the polymer with concentrated hydrochloric acid for several hours only a small amount of sebacic acid and hydrazine was set free showing that a major part of the polymer was completely resistant to hydrolysis.

EXAMPLE 3

*Treatment of hydrolysable polymer with aniline*

20 parts by weight of the polymer prepared according to Example 1 were heated in an autoclave with 20 parts by weight of aniline for 4 hours at 220° C. The maximum pressure developed was 140 lb. per square inch. The product was purified by dissolving in methanol and reprecipitating into water several times. It was a light brown solid melting at 105–106° C., was insoluble in water and acetone and soluble in methanol and 50/50 methanol/chloroform.

EXAMPLE 4

*Treatment of hydrolysable polymer with monomethyl hydrazine*

20 parts by weight of the polymer prepared according to Example 1 were heated in an autoclave with 30 parts by weight of 23% aqueous monomethyl hydrazine for 2 hours at 220° C. The maximum pressure developed at this stage was 350 lb. per square inch. The temperature was then raised to 260° C. and this temperature was maintained for ½ hour when the pressure was reduced from 900 lb. per square inch down to 300 lb. per square inch during 15 minutes. Heating was continued at 260° C. for a further ½ hour while maintaining the pressure. The product was a very viscous syrup soluble in methanol. Hydrolysis with boiling hydrochloric acid showed that it was considerably more resistant to hydrolysis than the original hydrolysable polymer but not so completely resistant as the product of Example 2.

EXAMPLE 5

30 parts by weight of the polymer prepared according to Example 1 were heated in an autoclave with 47 parts by weight of 20% aqueous monoethylamine for 2 hours at 220° C. The maximum recorded pressure was 250 lb. per square inch. The product achieved was a light-coloured solid, melted at 150° C. and gave short filaments from the melt. The polymer was insoluble in water and acetone and soluble in methanol and in 50/50 methanol/chloroform.

Having described our invention, what we desire to secure by Letters Patent is:

1. Process for improving the properties of a preformed linear polymer obtained by heating a reaction mixture, which reaction mixture on complete hydrolysis yields a dicarboxylic acid free from reactive groups other than the carboxy groups and from 1 to 2 moles of hydrazine for each mole of dicarboxylic acid, which polymer suffers a substantial loss in intrinsic viscosity on hydrolysis with hydrochloric acid, which comprises heating the said polymer with an organic base containing a primary amino group and continuing the heating to produce a polymer resistant to hydrolysis by hydrochloric acid.

2. Process for improving the properties of a preformed linear polymer obtained by heating a reaction mixture, which reaction mixture on complete hydrolysis yields a polymethylene dicarboxylic acid free from reactive groups other than the carboxy groups and from 1 to 2 moles of hydrazine for each mole of dicarboxylic acid, which polymer suffers a substantial loss in intrinsic viscosity on hydrolysis with hydrochloric acid, which comprises heating the said polymer with an organic mono-primary amine and continuing the heating to produce a polymer resistant to hydrolysis by hydrochloric acid.

3. Process for improving the properties of a preformed linear polymer obtained by heating a reaction mixture, which reaction mixture on complete hydrolysis yields sebacic acid and from 1 to 2 moles of hydrazine for each mole of sebacic acid, which polymer suffers a substantial loss in intrinsic viscosity on hydrolysis with hydrochloric acid, which comprises heating the said polymer with an organic mono-primary amine and continuing the heating to produce a polymer resistant to hydrolysis by hydrochloric acid.

4. Process for improving the properties of a preformed linear polymer obtained by heating a reaction mixture, which reaction mixture on complete hydrolysis yields sebacic acid and from 1 to 2 moles of hydrazine for each mole of sebacic acid, which polymer suffers a substantial loss in intrinsic viscosity on hydrolysis with hydrochloric acid, which comprises heating the said polymer with an organically substituted hydrazine in which one of the nitrogen atoms still carries two hydrogen atoms attached to it, and continuing the heating to produce a polymer resistant to hydrolysis by hydrochloric acid.

JAMES WOTHERSPOON FISHER.
EDWARD WILLIAM WHEATLEY.

No references cited.